(12) United States Patent
Gridley

(10) Patent No.: US 7,178,851 B1
(45) Date of Patent: Feb. 20, 2007

(54) PROTECTIVE DEVICE FOR THE CARGO AREA OF A VEHICLE AND CORRESPONDING METHODS

(76) Inventor: Garth Gridley, 11649 St. Josephs Rd., Jacksonville, FL (US) 32223

( * ) Notice: Subject to any disclaimer, the term of this patent is extended or adjusted under 35 U.S.C. 154(b) by 0 days.

(21) Appl. No.: 11/170,363

(22) Filed: Jun. 29, 2005

(51) Int. Cl.
*B60R 13/01* (2006.01)

(52) U.S. Cl. .................... 296/39.1; 296/39.2

(58) Field of Classification Search ........... 296/24.1, 296/39.1, 37.5, 37.16, 39.2
See application file for complete search history.

(56) References Cited

U.S. PATENT DOCUMENTS

| | | | | |
|---|---|---|---|---|
| 2,803,491 | A * | 8/1957 | Brown | 296/39.2 |
| 4,461,402 | A * | 7/1984 | Fell et al. | 296/39.1 |
| 4,877,281 | A | 10/1989 | Altmann | |
| 4,936,724 | A * | 6/1990 | Dutton | 296/39.2 |
| 5,110,171 | A | 5/1992 | Anthony | |
| 5,683,132 | A | 11/1997 | Danzo | |
| 5,722,710 | A | 3/1998 | Falciani | |
| 6,203,089 | B1 | 3/2001 | Doolittle | |
| 6,595,568 | B1 | 7/2003 | Schroeder | |
| 6,755,383 | B2 * | 6/2004 | Davis | 248/508 |
| 2005/0218682 | A1 * | 10/2005 | Klotz et al. | 296/39.1 |

* cited by examiner

*Primary Examiner*—Jason Morrow
(74) *Attorney, Agent, or Firm*—Allen, Dyer, Doppelt, Milbrath & Gilchrist, P.A.

(57) ABSTRACT

A protective device for a cargo area of a vehicle having doors and a rear opening includes an enclosure to be positioned in the cargo area of the vehicle and having an opening for receiving cargo. A plurality of straps is attached to the enclosure for extending through the doors and rear opening for connecting external the vehicle for securing the enclosure within the cargo area.

26 Claims, 3 Drawing Sheets

US 7,178,851 B1

PROTECTIVE DEVICE FOR THE CARGO AREA OF A VEHICLE AND CORRESPONDING METHODS

FIELD OF THE INVENTION

The present invention relates to the field of vehicles, and more particularly, to a protective device for the cargo area of a vehicle.

BACKGROUND OF THE INVENTION

The cargo area of a motor vehicle, such as a van, sport utility vehicle (SUV) or station wagon, allows users to carry a variety of items. When the cargo area is used for passengers instead of carrying items, a clean interior is desired.

Consequently, the cargo area of the vehicle interior should be kept clean when carrying items. To maintain a clean interior within a vehicle when transporting items such as lumber, sand, gravel or small shrubs, for example, a protective device may be placed in the cargo area to protect the interior of the vehicle. The various items are placed within an enclosure of the protective device so that the interior is not damaged or soiled.

Several types of protective devices are available. For example, U.S. Pat. No. 6,203,089 to Doolittle discloses a protective device secured by internal mechanisms within the cargo area of the motor vehicle. Similarly, U.S. Pat. No. 6,595,568 to Schroeder discloses a protective device secured within the vehicle's cargo area. These protective devices respectively comprise an enclosure, and hooks and fasteners are attached thereto to engage coat hooks or similar mechanisms along the vehicle interior wall or floor. These internal connections have inherent strength limitations, and as a result, heavy and bulky items may not be adequately secured by the protective devices when in the vehicle. As a result, these protective devices have weight and size limitations with respect to the items placed therein.

SUMMARY OF THE INVENTION

In view of the foregoing background, it is therefore an object of the present invention to provide a protective device that adequately secures heavy and bulky items within the cargo area of a vehicle.

This and other objects, features, and advantages in accordance with the present invention are provided by a protective device for a cargo area of a vehicle having a plurality of doors and a rear opening. The protective device comprises a collapsible enclosure and means for maintaining the enclosure in an open condition, such as a plurality of straps attached with the enclosure. The enclosure has an opening for receiving cargo, and is positioned in the cargo area of the vehicle. The plurality of straps may extend through the plurality of doors and the rear opening for connecting external the vehicle for securing the enclosure in an open condition within the cargo area.

The plurality of straps may comprise one or more pair of door straps for extending through a driver's side door and an opposing passenger's side door for connecting together external the vehicle. The plurality of straps may further comprise one or more rear straps for extending through the rear opening for connecting to a pair of door straps. Alternatively, the rear straps may connect to a luggage rack on the vehicle. The externally connected straps advantageously secure the enclosure so that heavy and bulky items may be placed therein so as to prevent damage to the interior of the vehicle in the cargo area.

The plurality of straps may be adjustable in length, and each pair of door straps may comprise a fastener. In addition, each rear strap may comprise a fastener which may be a self-connecting fastener. The fasteners may be hook and loop fasteners, for example, fasteners sold under the VEL-CRO trademark.

The enclosure material may be made of polyurethane and cloth, for example. The straps may be attached adjacent a top surface of the enclosure. The enclosure includes a bottom surface adjacent the opening, and may further comprise a flap attached to the bottom surface and extending outward from the opening. The flap helps protect the floor of the vehicle when loading and removing the items in the enclosure.

Another aspect of the present invention is directed to a method for protecting a cargo area of a vehicle using a protective device comprising a collapsible enclosure having an opening therein for receiving cargo and a plurality of straps attached to the enclosure. The method comprises positioning the enclosure in an open condition within the cargo area of the vehicle, and extending the plurality of straps through doors and a rear opening of the vehicle. The plurality of straps are connected external the vehicle for securing the opened enclosure within the cargo area in order to protect the interior of the vehicle.

DETAILED DESCRIPTION OF THE INVENTION

Figure 1:
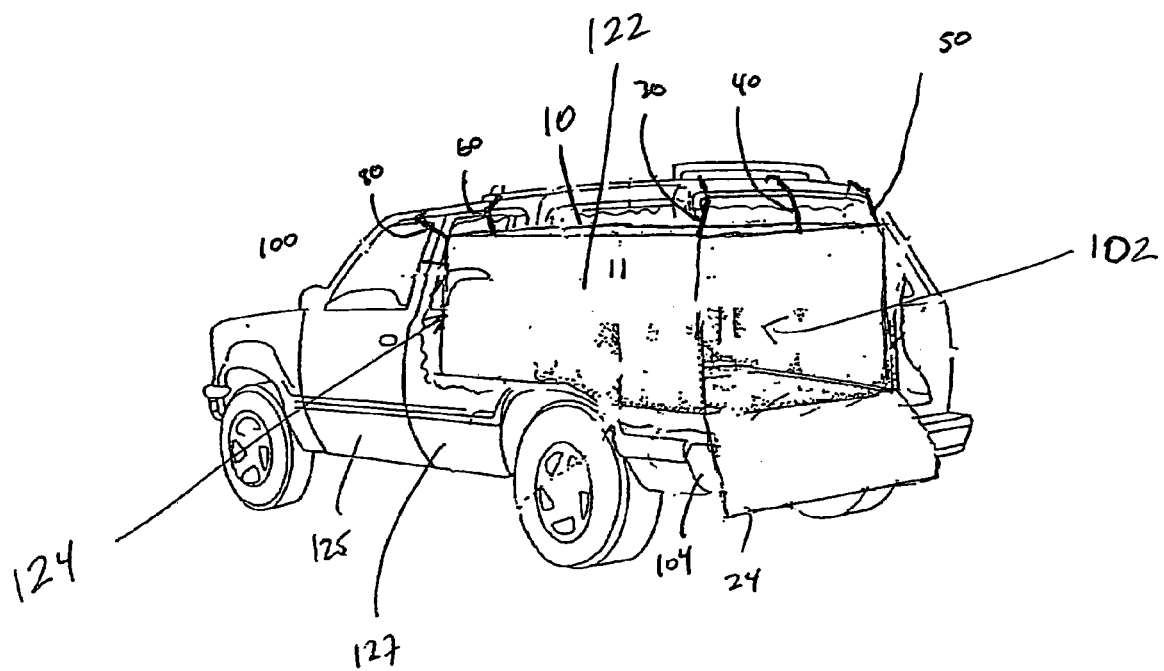
FIG. 1 is a cut away perspective view of a vehicle cargo area illustrating a protective device secured therein in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this disclosure will be thorough and complete, and will fully convey the scope of the invention to those skilled in the art. Like numbers refer to like elements throughout.

A protective device 10 for a cargo area 122 of a vehicle 100 will now be described with reference to FIGS. 1–3. Noting FIG. 1, a collapsible enclosure 11 is illustrated positioned in the cargo area 122 of the vehicle 100. Typically, the vehicle 100 may be a van, sport utility vehicle, station wagon, or similar vehicle in which the rear seat capacity could be easily converted for storage use.

After the enclosure 11 is placed into the rear opening 102 of the vehicle 100, the enclosure 11 is typically moved into the cargo area 122 until it approaches or makes contact with the rear face 124 of the vehicle front seats. The enclosure 11, however, may be inserted any depth into the cargo area 122 of the vehicle 100. A rear opening 22 in the enclosure 11 provides access through the rear opening 102 of the vehicle to permit cargo to be inserted within the enclosure 11. The enclosure 11 has several straps 30, 40, 50, 60, 70, 80, 90 attached for extending through the doors 125, 126, 127, 128 and the rear opening 102 for connecting external the vehicle 100 for securing the enclosure 11 within the cargo area 122.

Figure 2:
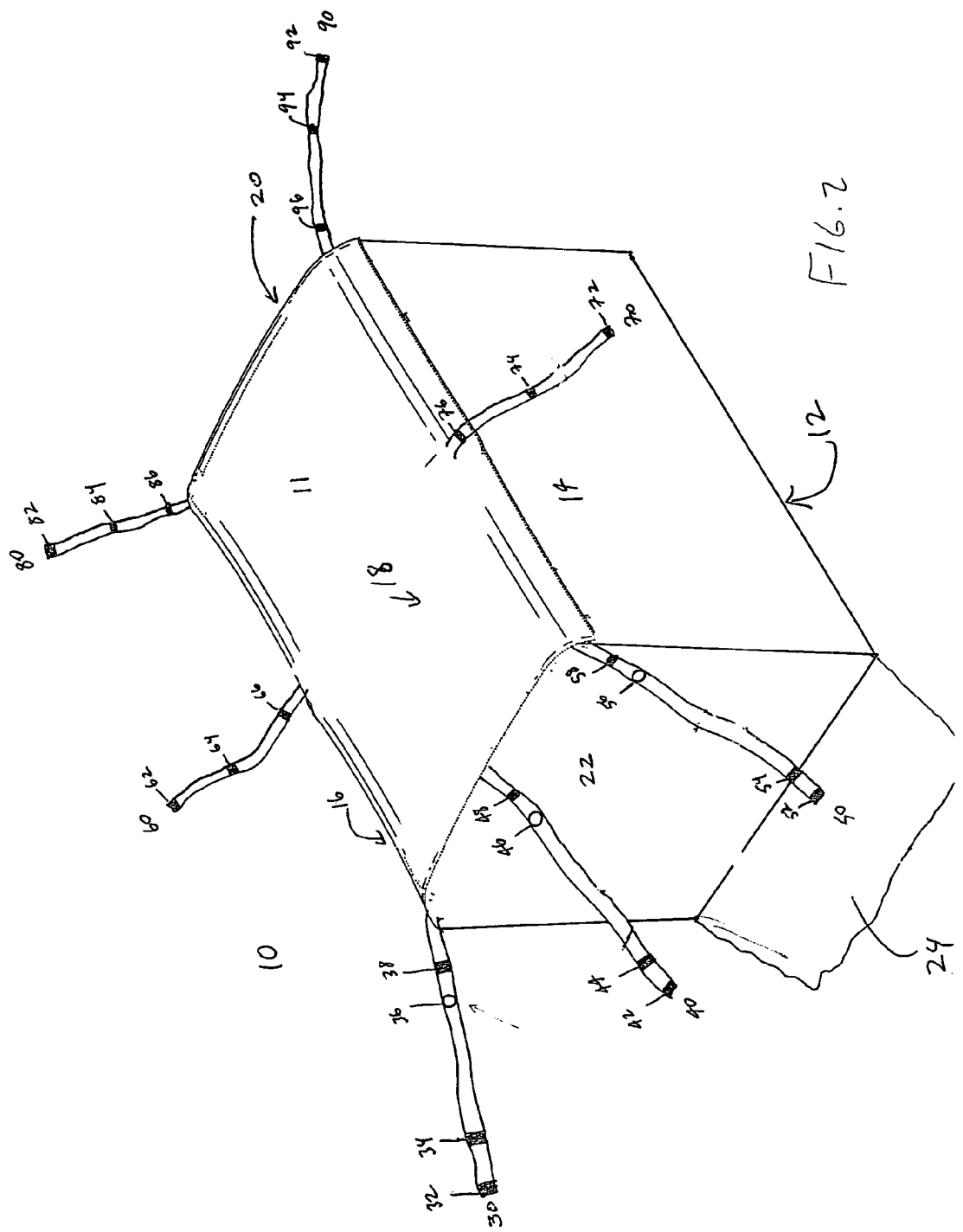
FIG. 2 is a perspective view of the protective device in FIG. 1 removed from the vehicle.
Figure 3:
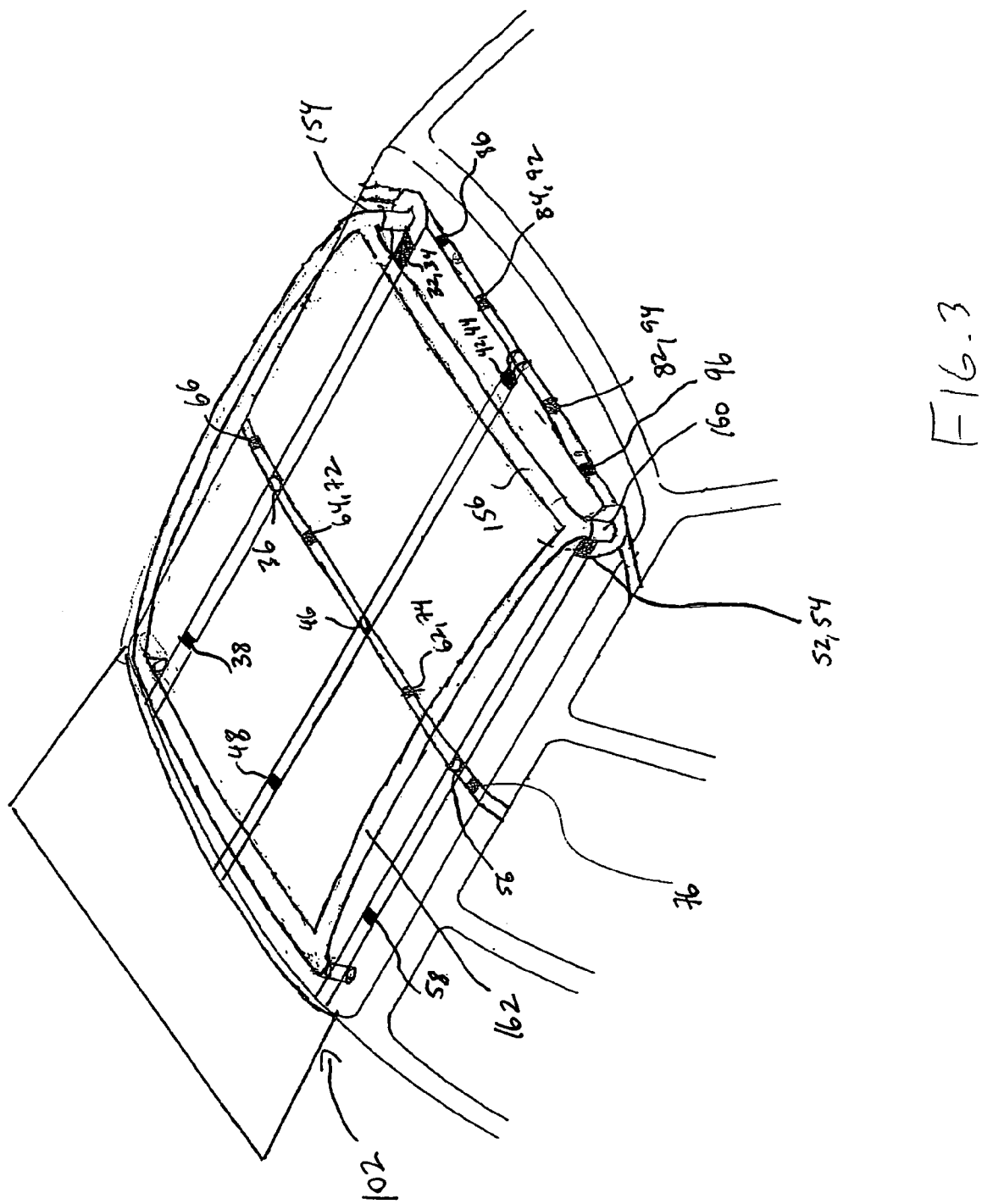
FIG. 3 is a top perspective view of the vehicle in FIG. 1 illustrating the straps connected external the vehicle.

While the enclosure 11 illustrated in FIGS. 1–3 has a rectangular shaped cross-section, it may have any polygon-shaped or circular cross-section and be secured within the cargo area 122 of the vehicle 100.

The enclosure 11 includes a base portion 12 arranged to cover at least a portion of the cargo area floor, and a flap portion 24 attached to the base portion 12 and extending out from the rear opening 102. Side portions 14 and 16 are attached to the base portion 12 and are arranged to cover at least a portion of the vehicle interior sidewalls. A top portion 18 is attached to the side portions 14,16 and is arranged to cover at least a portion of the vehicle interior ceiling. A front end portion 20 is attached to each of the top portion 18, the side portions 14,16 and the base portion 12. An open end portion 22 opposite the front end portion 20 provides access through the vehicle rear opening 102 to the enclosure 11. The enclosure 11 material may be one or a combination of polyurethane and cloth, for example.

Two pairs of door straps 60, 70 and 80, 90 each extend through a driver's side door 125 and 127, respectively; and an opposing passenger's side door 126 and 128, respectively, for connecting together external the vehicle 100. Additionally, three rear straps 30, 40, 50 each extend through the rear opening 102 for connecting to a pair of door straps 80,90 on the vehicle roof. While the preferred embodiment includes two pairs of door straps and three rear straps, any number of door straps, rear straps, or combination of both can be utilized to secure the enclosure 11 within the cargo area 122.

Rear straps 30, 50 are attached approximately at the endpoints and rear strap 40 approximately at the midpoint of the line defined by the juncture of the open end 22 and top portion 18 of the enclosure 11. Door straps 60,70 are attached to the enclosure 11 approximately at the midpoint of the line defined by the juncture of the side portions 16 and 14, respectively and top portion 18 of the enclosure 11. Finally, door straps 80, 90 are attached to the enclosure 11 approximately at each of the opposite corners of the juncture of the front end portion 20, top portion 18, and side portions 16 and 14, respectively. The straps are typically attached to the enclosure 11 adjacent to its top portion 18. While the preferred embodiment includes the attachment of straps 30, 40, 50, 60, 70, 80, and 90 to enclosure 11, any number of door straps, rear straps, or combination can be attached anywhere along the enclosure 11.

Each pair of door straps 60, 70, and 80, 90 includes a fastener to secure that pair of door straps together on the roof. Door strap pair 60, 70, for example, includes fastener 62, 64, 72, 74. When door strap pair 60,70 is extended through opposing doors 127, 128, fastener components 62 and 64 of strap 60 connect to fastener components 74 and 72, respectively, of strap 70, securely connecting door straps 60 and 70 to one another. Door strap pair 80,90 similarly connect through fastener components 82, 84, 92, 94. Each rear strap 30, 40, 50 includes a fastener, but for self-connection as oppose to the mutual strap-to-strap connection of the door strap pairs. Roof strap 40, for example, includes fastener components 42, 44. When rear strap 40 extends out of the rear opening 102, longitudinally down the vehicle roof and loops back over connected door straps 80,90, fastener component 42 attaches to fastener component 44, thus forming a self-connecting strap 40.

The fastener components of the straps attached to the enclosure 11 are preferably hook and loop fasteners. The straps attached to the enclosure 11 are adjustable in length and include an adjustable length component 38, 48, 58, 66, 76, 86, 96 that allows the straps to be lengthened or shortened, as readily understood by those skilled in the art. After each door strap pair connection or rear strap self-connection, each strap adjustable length component is adjusted so as to secure the enclosure 11 within the cargo area 122 of the vehicle 100.

Rear straps 30, 40, 50 further include apertures 36, 46, 56 through which door straps 60, 70 thread through while door straps 60,70 are connected to one another, after rear straps 30, 40, and 50 are secured on the roof. Apertures 36, 46, 56 may include a hole within the strap material or a short strap stitched onto straps 30, 40, 50 forming a slit-type aperture for receiving door straps 60, 70.

The vehicle 100 may have a luggage rack 162 including two front rack knobs 154, 160. An alternate connection of the rear straps 30, 50 on the roof is self-connection around a portion of the luggage rack 162, including the rack knobs 154, 160 instead of the connection of rear strap 40 to the connected door straps 80, 90. The alternate connection can be made to any portion of the luggage rack 162, including the front bar 156 joining the front rack knobs 154, 160.

Another aspect of the present invention is directed to a method for protecting a cargo area 122 of a vehicle 100 using a protective device 10 including an enclosure 11 having an opening 22 for receiving cargo and a plurality of straps attached to the enclosure 11. The method comprises positioning the enclosure 11 in the cargo area 122 of the vehicle 100; extending the plurality of straps 30, 40, 50, 60, 70, 80, 90 through doors 125, 126, 127, 128 and a rear opening of the vehicle 102; connecting the plurality of straps external the vehicle for securing the enclosure 11 within the cargo area 122.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A protective device for a cargo area of a vehicle comprising doors and a rear opening, the protective device comprising:

an enclosure dimensioned to be positioned in the cargo area of the vehicle and having an opening therein for receiving cargo; and a plurality of straps attached to said enclosure for extending through the doors and the rear opening for connecting external the vehicle for securing said enclosure within the cargo area, said plurality of straps comprising:

at least one rear strap for extending through the rear opening for connecting to said at least one pair of door straps:

a front pair of door straps and a rear pair of door straps; and wherein said at least one rear strap includes an opening therein in which said rear pair of door straps pass therethrough when connected together.

2. A protective device according to claim 1, wherein said plurality of straps comprise at least one pair of door straps for extending through a driver's side door and an opposing passenger's side door for connecting together external the vehicle.

3. A protective device according to claim 1, wherein the vehicle further comprises a luggage rack; and wherein said plurality of straps comprise at least one rear strap for extending through the rear opening for connecting to the luggage rack.

4. A protective device according to claim 1, wherein said plurality of straps are adjustable in length.

5. A protective device according to claim 2, wherein each pair of door straps comprises at least one fastener.

6. A protective device according to claim 5, wherein said at least one fastener comprises a hook and loop fastener.

7. A protective device according to claim 4, wherein each rear strap comprises a fastener.

8. A protective device according to claim 7, wherein said fastener comprises a self-connecting fastener.

9. A protective device according to claim 8, wherein each fastener comprises a hook and loop fastener.

10. A protective device according to claim 1, wherein said enclosure comprises at least one of polyurethane and cloth.

11. A protective device according to claim 1, wherein said plurality of straps are attached adjacent a top surface of said enclosure.

12. A protective device according to claim 1, wherein said enclosure includes a bottom surface adjacent the opening, and further comprising a flap attached to the bottom surface and extending outward therefrom.

13. A protective device according to claim 1, wherein said enclosure is rectangular in cross-section.

14. A method according to claim 1, wherein the plurality of straps comprise at least one pair of door straps for extending through a driver's side door and an opposing passenger's side door for connecting together external the vehicle.

15. A method according to claim 1, wherein the vehicle further comprises a luggage rack; and wherein
the plurality of straps comprise at least one rear strap for extending through the rear opening for connecting to the luggage rack.

16. A protective device for a cargo area of a vehicle comprising doors and a rear opening, the protective device comprising:
an enclosure dimensioned to be positioned in the cargo area of the vehicle and having an opening therein for receiving cargo; and a plurality of straps attached to said enclosure for extending through the doors and the rear opening for connecting external the vehicle for securing said enclosure within the cargo area, said plurality of straps comprising:
at least one pair of door straps for extending through a driver's side door and an opposing passenger's side door for connecting together external the vehicle; and
at least one rear strap for extending through the rear opening for connecting to said at least one pair of door straps;
said at least one pair of door straps comprising a front pair of door straps and a rear pair of door straps, and said at least one rear strap including an opening therein in which said rear pair of door straps pass therethrough when connected together.

17. A protective device according to claim 16, wherein the vehicle further comprises a luggage rack; and wherein said at least one rear strap connects to the luggage rack.

18. A protective device according to claim 16, wherein said plurality of straps are adjustable in length.

19. A protective device according to claim 16, wherein each pair of door straps comprises at least one fastener.

20. A protective device according to claim 19, wherein said at least one fastener comprises a hook and loop fastener.

21. A protective device according to claim 16, wherein each rear strap comprises a fastener.

22. A protective device according to claim 21, wherein said fastener comprises a self-connecting fastener.

23. A protective device according to claim 22, wherein each fastener comprises a hook and loop fastener.

24. A protective device according to claim 16, wherein said enclosure comprises at least one of polyurethane and cloth.

25. A protective device according to claim 16, wherein said plurality of straps are attached adjacent a top surface of said enclosure.

26. A protective device according to claim 16, wherein said enclosure includes a bottom surface adjacent the rear opening, and further comprising a flap attached to the bottom surface and extending outward therefrom.

* * * * *